Figure 1:
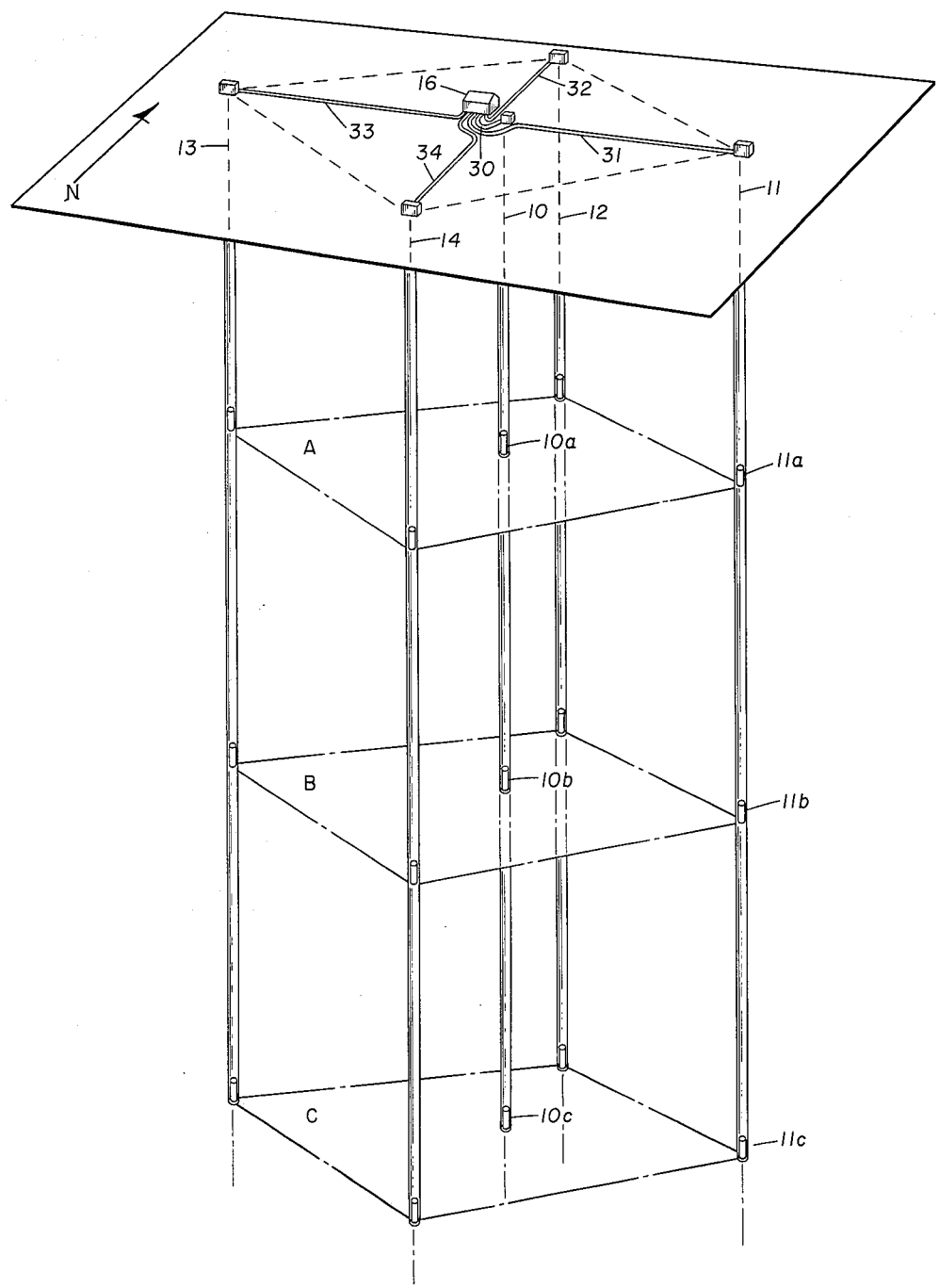

May 24, 1966

R. A. BRODING 3,252,541

SOLID ARRAY SEISMIC MONITOR SYSTEM

Filed Nov. 19, 1962

3 Sheets-Sheet 1

May 24, 1966   R. A. BRODING   3,252,541
SOLID ARRAY SEISMIC MONITOR SYSTEM
Filed Nov. 19, 1962   3 Sheets-Sheet 2

May 24, 1966  R. A. BRODING  3,252,541
SOLID ARRAY SEISMIC MONITOR SYSTEM
Filed Nov. 19, 1962  3 Sheets-Sheet 3

United States Patent Office
3,252,541
Patented May 24, 1966

3,252,541
SOLID ARRAY SEISMIC MONITOR SYSTEM
Robert A. Broding, Tulsa, Okla., assignor to Century Geophysical Corporation, Tulsa, Okla., a corporation of Delaware
Filed Nov. 19, 1962, Ser. No. 238,645
8 Claims. (Cl. 181—.5)

This invention relates to the improvement in signal-to-noise ratio of seismic events and to the determination of the direction from a listening station to a source of pulsed seismic energy. In a more specific aspect, it relates to a monitoring system for identifying and determining the direction of travel of low frequency seismic waves.

In monitoring explosions such as those involved in development programs utilizing atomic energy, it is desirable to provide a sufficiently exact measurement that a seismic event can be identified and the location of the site of the explosion can be pinpointed to within a radius of a few miles after travel even from one continent to another. In another aspect, some proof as to the location of a source of energy actually responsible for damage to structures, often not available, may be recorded in accordance with this invention. However, the invention relates primarily to a system for monitoring seismic energy such as generated upon nuclear testing, whether coupled directly to the earth or conducted in the atmosphere.

In seismic exploration, the instant of generation of the event to be measured generally is known or is ascertainable. In such operations it has been a practice to plant seismic detectors in a pattern and then to record the signals from the detecting stations on a time scale having its origin coincident with the initiation of the event. In contrast, the present invention provides for measurement where the time at which an event may be initiated is unknown. Furthermore, not only is time of a given event unknown, but also unknown is the location of the point of generation. Thus there is provided a problem quite different from anything experienced in the seismic exploration field. The problem is somewhat like the problem involved in earthquake seismology, but the resolution to be achieved is far greater. Coupled with the above problem is the fact that the energy of primary interest is in the very low frequency seismic range, being generally confined to signals of frequency of from 1 to 10 cycles per second or lower, whereas the frequency band of interest in exploration operations is in the range of from 30 to 100 cycles.

Resolution of seismic events in a noise spectrum can be improved by increasing the signal-to-noise ratio so that the polarity, wave form and time of arrival can be more precisely ascertained. In one method of improving the signal-to-noise ratio, a multiplicity of detection points form an array where there is separation between detectors sufficient that the noise is random or incoherent. By time shifting signals or events to produce coherence in time and then compositing, the signals will add directly as the number of detectors while the random noise will add as the square root of the number of detectors. Thus the signal-to-noise ratio is improved by the $\sqrt{N}$ where N is the number of detectors in the array.

The foregoing is employed in the present invention along with a second means for improving the signal-to-noise ratio. The latter makes use of the attenuation of Rayleigh wave energy with depth. Generally, seismic noise is a man-made or cultural noise resulting in surface waves of the Rayleigh type. Such energy propagates strongly along the surface of the earth but is attenuated exponentially with depth. Therefore, if detectors are placed at depth in the earth, this form of noise is greatly decreased.

In accordance with the present invention, provision is made for monitoring seismic waves wherein a plurality of signals simultaneously are recorded in reproducible form representing seismic energy arriving at each of a plurality of points at selected subterranean depths in a plurality of bore holes spaced one from another as a receiving station. There is provided a means for simultaneously reproducing the signals and means for combining the signals in selected sets wherein each set is limited to signals representing waves arriving at points in the array along a selected axis of reference. Means are then provided for measuring the time differences between the instances of arrival of coherent energy components of the signals in each of the sets for determining the direction of arrival of the coherent energy components.

Further, in accordance with the present invention, there is provided a method of sensing the direction to a pulsed source of seismic energy. The arrival of acoustic energy at a plurality of sensing stations is detected. The sensing stations preferably are spaced in a solid array at distances of the order of a half wave length at frequencies of the order of from 1 to 10 cycles per second. The signals are recorded individually in phonographically reproducible form. Upon reproduction the recorded signals are played back at a substantially higher rate than the rate of recording thereof in order to permit the accommodation of the instrumentation to the low frequency signals. Upon playback the relative amplitudes of the reproduced signals are modified so that incoherent noise is of a level of substantially equal amplitude for all channels. Thereafter, the relative time relationships between the signals are shifted and an indication is obtained of the magnitude of the shift necessary to bring into coincidence the coherent components of the signals sensed along each of three axes selected in the array.

In a more specific aspect of the invention, the playback signals are searched as to various values of phase shift necessary to bring about the maximum coherence and, when composited, the maximum signal-to-noise ratio.

In a still more specific aspect, a seismic array is provided in which a symmetrical array of five bore holes extend into the earth, each loaded with three detectors, one detector in each hole for each of three spaced apart levels. Preferably, the levels are at substantial depths in the earth and are spaced uniformly one from the other at least as far as the shortest distance between any two holes in the array. The signals from each level are then combined and separately recorded. The signals from detectors lying in each of two mutually perpendicular vertical planes are then mixed and separately recorded in order to provide a three-dimensional indication of direction of arrival.

Figure 2:
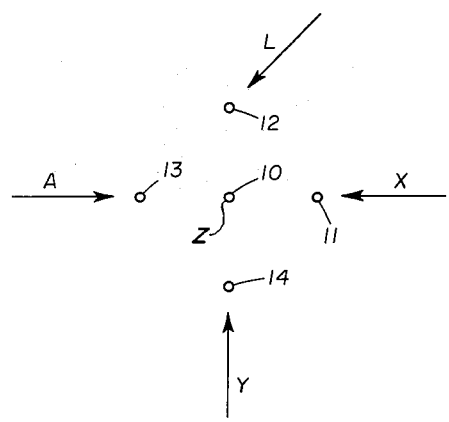
Figure 4:
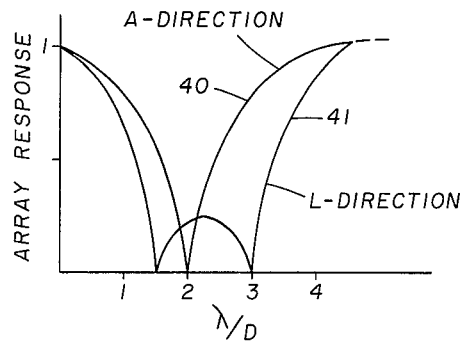
Figure 3:
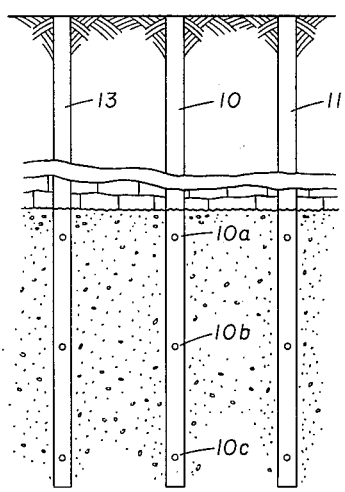
Figure 6:
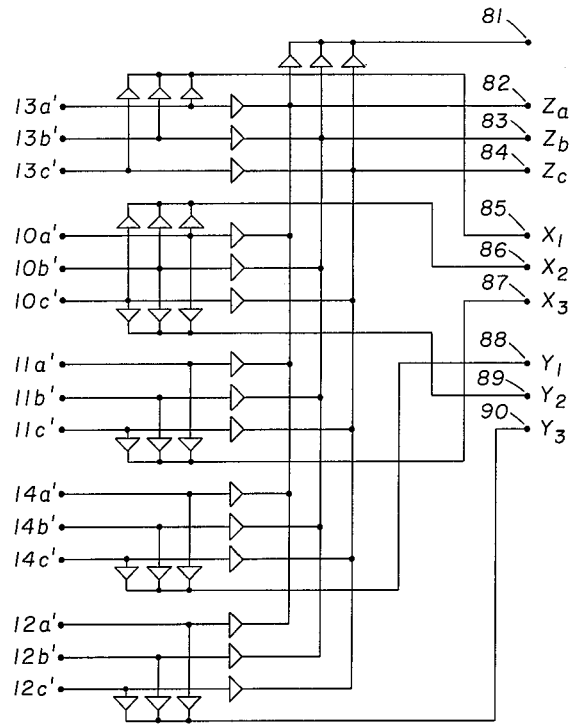
Figure 5:
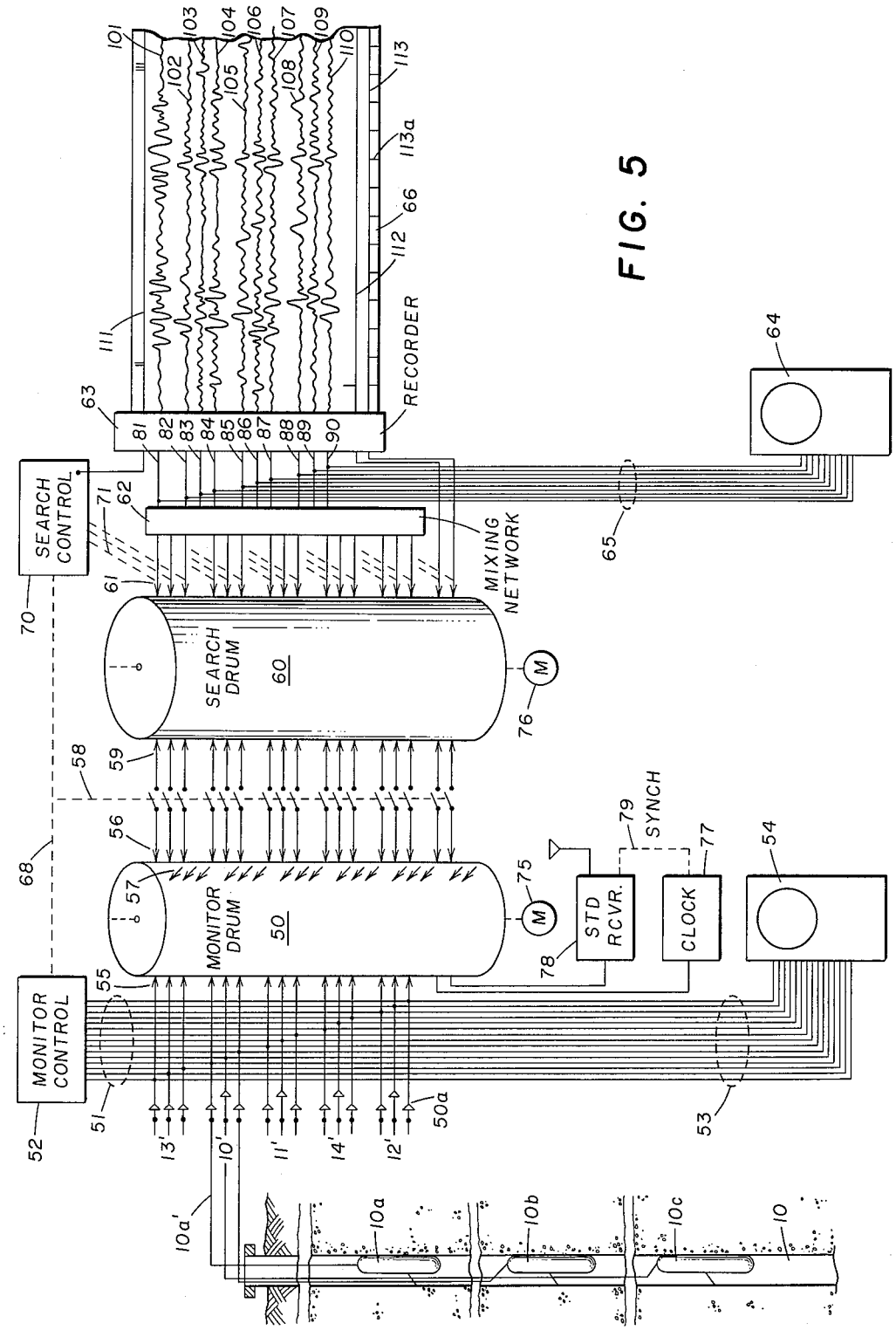

For a more complete understanding of the present invention and for further objects and advantages thereof, reference may now be had to the following description taken in conjunction with the accompanying drawings in which:

FIGURE 1 is a diagrammatic representation of the monitoring system of the present invention;
FIGURE 2 is a top view of the location array;
FIGURE 3 is a sectional view taken through the holes 1-2-3 of FIGURE 2;
FIGURE 4 indicates a directional response of the array of FIGURES 1-3;
FIGURE 5 is a schematic diagram of the system for recording in accordance with the present invention; and
FIGURE 6 is a diagram of the mixing network of FIGURE 5.

In FIGURE 1 there is illustrated a system for monitoring low frequency seismic waves. The embodiment illustrated in FIGURE 1 involves the use of five bore holes located in a symmetrical array with the mouth of bore hole 10 at the center of the array and holes 11, 12, 13 and 14 emerging on mutually perpendicular horizontal axes having their origin at the bore hole 10. A recording station 16 is located within the area to which cables extend from each of the bore holes 10–14.

In each of the holes 10–14 are three detectors. In hole 10 the detectors 10a, 10b and 10c are planted at each of three levels A, B and C. In hole 11 detectors 11a, 11b and 11c are employed at the same levels A–C, respectively. Similarly, detectors are located in vertical linear arrays in each of holes 12–14, the detectors being identified by reference characters consistent with those of detectors 10a–10c. Thus, fifteen detectors are employed, five detectors being located in horizontal planar arrays in each of three horizontal planes A, B and C. Preferably, the planes A–C are spaced one from another at least as great a distance as the minimum distance between any two of the holes 10–14. In one embodiment, the holes 10–11 were spaced 1300 feet apart with the planes A–C spaced 1300 feet one above the other. The array, utilizing the vertical and horizontal arrays, forms a solid array.

The detectors employed were low frequency detectors of a type manufactured and sold by Hall-Sears, of Houston, Texas, identified by catalog number HS-10. Suitable detectors also are manufactured and sold by Texas Instruments, Incorporated, of Dallas, Texas, and designated as type S-36. The detectors were located in each of the holes 10–14 by spiking them or pegging them at the casing collar nearest the location of the horizons A, B, C. Substantially uniform spacing was thus achieved at each of the horizons A–C.

In FIGURE 1, cables 30–34 extend from the wellhead of each of the holes 10–14 to the recording instrument housing or station 16. The signals from each of the detectors 10a–14c are transmitted to the recording station 16 separately. They are then recorded individually on magnetic tape or by other means as to be phonographically reproducible.

In a monitoring operation, the recording system at station 16 may be continuously energized as to sense all seismic events of coherent nature which may arrive at the detector array. When a burst of coherent energy arrives, a permanent record is made thereof. However, during the intervals in which no coherent energy appears at the station, the signals may be only temporarily recorded. As a result, only the coherent energy components of the detected signals will be retained for analytical operations hereinafter described. The monitoring control to retain only signals during time intervals characterized by the coherent components may be of the type shown in FIGURE 5, which will later be described.

In FIGURE 2 there is shown the surface or top view of the bore hole array of FIGURE 1. In FIGURE 3 a sectional view is shown with dimensions indicated. In FIGURE 2 it will be noted that the holes 11–14 are located at the corners of a rectangle with the hole 10 at the geometrical center thereof. In FIGURE 3 the detectors are located at uniformly spaced depths with the shallowmost level being located substantially below the earth's surface. By this means the noise level encountered by the detectors is substantially reduced relative to the noise level at the earth's surface. It has been found that noise is generally the result of wind blowing in trees or cultural noise, as well as man-made, i.e., traffic noise. Such energy propagates freely along the surface as Rayleigh waves and thus produces a high noise level for surface arrays. However, Rayleigh wave energy attenuates exponentially with depth so subsurface detectors are correspondingly quieter than surface detectors.

In FIGURE 4 the response of the array of FIGURES 2 and 3 for energy arriving as in the A direction and along an oblique or L direction is illustrated. The response is plotted as a function of the ratio of wave length to distance between detectors. The curves 40 and 41 are representative of the amplitude of the output signal that would be derived from a circuit in which all of the detectors at a given level are connected in parallel. The curve 40 is that produced by an acoustic signal source of instantaneous monofrequency character with the frequency continuously variable over the range represented by the abscissa plotted in FIGURE 4. Curve 41 shows the response of the system for waves arriving at the array obliquely as along the direction L of FIGURE 2.

From the curves illustrated in FIGURE 4 it is evident that the array itself has some directional characteristics which might be relied upon to provide an indication of direction of arrival of acoustic energy. However, in accordance with the present invention, the signals from each of the separate detectors are recorded individually and the resulting recording is then treated to provide an indication of high resolution of the direction of arrival at the array of coherent acoustic energy.

In addition to the above improvement in signal-to-noise, there is an additional improvement due to having the seismometers at depth. A high percentage of the noise detected at the surface is Rayleigh wave propagated signals. Rayleigh waves decay exponentially with depth; therefore, such noise falls off faster than signals. Note the amplitude of ground motion at the surface is approximately twice the amplitude at depth due to reinforcement of the surface reflected signal adding to the direct signal. Thus the noise level has to fall off more than a factor or two before any net gain in signal-to-noise is obtained. A net increase in signal-to-noise of approximately two due to the depth factor is embodied in following the present invention. This would indicate an increase of seven to eight times with the array of FIGURE 1, i.e., a factor of 3.8 for compositing and a factor of 2.0 for depth.

One embodiment of the invention for carrying out this operation is illustrated in FIGURE 5. This system is provided with a monitoring unit which permits the continuous sensing of acoustic energy in the array and the selective storage and treatment of coherent components thereof. It will be recognized that other systems may be employed to carry out the invention and that the system illustrated in FIGURE 5 is to be taken as representative of such variations as will occur to those skilled in the art.

In FIGURE 5 only one of the five bore holes, bore hole 10, has been shown with the detectors 10a, 10b and 10c located at the selected levels A, B and C, respectively, in the bore hole 10. As indicated, the detector 10a is provided with a spike unit extending from the detector housing which permits the detector to be hung or fixed at a selected location in the well 10. Each of the detectors in each of the bore holes will similarly be positioned so that they will remain fixed and quiescent as they sense the arrival of acoustic energy.

A cable or signal channel extends from each of the detectors to the input of a monitor drum 50. For sake of simplicity, the signal channel leading from each detector is given the same reference character as the detector with the addition of the prime. Thus, the signal channel from detector 10a is identified as channel 10a'. The signal channels 10a'–14c' are also connected by way of a multichannel cable 51 between monitor control unit 52 and by way of a multiconductor cable 53 to an oscilloscope 54.

The monitor drum 50 is provided with seventeen channels and is in the form of a delay line having a set of input recording heads 55, a set of playback heads 56, and a set of erase heads 57. The playback heads 56 are connected by way of a gang switch 58 to a set of recording heads 59 associated with a search drum 60. Search drum 60 is provided with a set of playback heads 61 which, in turn, are connected by way of a mixing network 62 to the input of a multitrace oscillographic recorder 63, as well as to the input of an oscilloscope 64. The multichannel cable 65 serves to interconnect the outputs of the mixing network 62 and the oscillograph 64.

By use of the system there is produced a record, such as record 66, which will provide a direct measurement of the direction of arrival of acoustic energy having coherent components at the detector array.

The monitor control 52 is coupled by way of a linkage 68 to the gang switch 58 and to a search control unit 70. The search control unit 70 is coupled by way of linkages, such as the linkages 71, to the individual playback heads in the back of playback bank 61 to shift them one relative to the other around the periphery of the search drum 60 so that an effective time shift may be introduced as between the signals recorded on the various channels.

Signal scanning has been generically disclosed by Frank Rieber, Geophysics, 1936, volume 1, page 97 et seq. In the present case, however, scanning is simultaneously carried out for each of three planes under the control of the unit 70 so that three components of motion can be sensed.

The monitor drum 50 is operated under control of and is driven by a motor 75. The search drum 60 is driven by a motor 76. Suitable power supplies (not shown), such as are well-known in the art, may be provided for the motors 75 and 76. In addition, each of the detectors 10a, 10b and 10c and the additional detectors in the other testholes are provided with preamplifiers of well-known variety located within the bore hole so that the signals delivered to the surface as by way of channels 10a'–14c' will be of relatively high amplitude and thus will provide a measure of discrimination over any induced signals.

The detectors 10a–14c provide signals for the first fifteen inputs of the bank of recording heads 55. The sixteenth input is driven from a clock 77. The seventeenth input is driven by a time standard such a radio receiver 78 which may be tuned to a time standard such as the radio station WWV. A linkage 79 is illustrated as applied between the clock 77 and the receiver 78 in order to provide synchronization as between the two time standards.

In carrying out the present invention in one mode thereof, the system illustrated in FIGURE 5 may be operated in the following manner. The drums 50 and 60 may be continuously operated. Signals appearing at the recording bank 55 will be temporarily stored on the monitor drum 50. The signals as they reach the pickup or playback bank 56 will appear at the switch bank 58. The signals from the detectors are also applied to the monitor control unit 52. The unit 52 is operated to selectively close the switch bank 58 to apply the signals detected by the playback heads 56 to the search drum 60.

The monitor control 52 may be operated in any one of a number of modes depending upon the criteria upon which the search drum is to be operated. One mode includes monitoring the amplitude of one of the signals on channels 10a'–14c' so that when a signal of substantially increased amplitude relative to the background appears there will be generated a control signal to actuate the link 68 which will close the switch bank 58 and retain the same closed for a period sufficient to transfer from the monitor drum 50 to the search drum 60 the signals recorded on the drum 50. Alternatively, two or more of the signals on channels 10a'–14c' may be required with a suitable coincidence network in the monitor control unit 52 to require the appearance on some or all of the signal channels of high amplitude signals before the search drum will come into operation.

It will be noted that a bank of amplifiers 50a are provided at the input to the monitor drum 50. The cable 53 applies the signals at the output of the amplifier banks 50a to the oscilloscope 54. An operator, preparatory to setting the system in operation, will observe the amplitudes of the various signals on the oscilloscope 54 and will adjust the gain of the individual amplifiers in the bank 50a so that there is substantially equal background or noise level on all of the signal channels. When this is done, the monitor control unit 52 may employ several or all of the signals for the generation of an actuating signal with reliability. It will be noted that the erase bank 57 is located immediately following the playback bank 56 so that the signals appearing at the array may be continuously sensed by the monitor control unit 52 and may be captured in a permanent form on the search drum 60 for analytical operations which will now be described.

The switch bank 58 will remain closed under control of the monitor control unit 52 for a period sufficient to record the event of interest. In a preferred mode of operation, the signals are recorded on drum 60 in response to the monitor control unit 52 at a first and relatively low drum speed. For the subsequent operations the speed of drum 60 is preferably increased substantially so that the signal frequency as related to absolute time will be substantially higher than the low frequency signals detected by the detectors 10a–14c and may thus be accommodated in the more highly developed and conventional instrumentation employed in seismic exploration. However, regardless of the speed at which the playback and analytical operations are conducted with respect to the search drum 60, the following operations may be carried out in order to provide a clear indication of the direction of arrival of the coherent components of signals detected be the array. The monitor control 52 is coupled by linkage 68 to a search control unit 70. The linkages 71 are connected individually to the playback heads in the playback bank 61. The search control unit 70 may modify the relative locations of the playback heads in the bank 61 to provide a series of output recordings from the multitrace recorder 63. For example, the search control 70 may be programmed to modify the relative time displacements as between the playback heads in bank 61 by predetermined increments from one limit to another in discrete steps so that there will be produced a plurality of recordings such as that illustrated at the output of the recorder 63. One such recording will be provided for each of the settings of the playback heads in the bank 61.

An observer or computer may then take the recordings thus produced of the adjusted time relationships between the signals on drum 60 and select those signals of maximum amplitude on each of the various traces as indicative of the time shift necessary to bring signals into coincidence. This time shift may then be related to the detectors employed in the combined signals recorded to compute or determine the direction of arrival.

It will be noted that the bank 61 is connected to the recorder 63 by way of a mixing network. One mixing network is illustrated in detail in FIGURE 6. The input channels 10a'–14c' are interconnected to provide signals at ten output terminals as follows. At the output terminal 81 there is a signal representative of the combined outputs of all of the fifteen detectors. At terminal 82 there is provided a signal representative of the combined outputs of all of the five detectors at the level A. At terminal 83 the signal is representative of the combined outputs of all the detectors at level B, and the signal at terminal 84 represents the combined outputs of all of the detectors at level C. At terminals 85, 86 and 87 there appear signals representative of the combined outputs of the three detectors in holes 13, 10 and 11, respectively. At terminals 88, 89 and 90 there appear signals representative of the combined outputs of the three detectors in each of holes 14, 10 and 12, respectively.

Thus, the signals at terminals 82–84 provide an indication of the travel of the wave of coherent energy along the Z axis of FIGURE 2. The signals on terminals 85–87 provide a measure of the velocity of the signal traveling along the X axis of FIGURE 2, and the signals on terminals 88–90 provide a measure of the velocity of signals traveling along the direction of the Y axis of FIGURE 2.

The signals on terminals 81–90 are thus applied to the recorder 63 so that the top signal trace 101 represents the combined outputs of all of the signals from all the detectors. The trace 102 represents the combined signals from the detectors at the A level. The trace 103 represents the combined outputs of the detectors at the B level. The trace 104 represents the combined outputs of the detectors at the lower or C level. The trace 105 represents the combined outputs of detectors in hole 13. The trace 106 represents the combined outputs of detectors in hole 10, and the trace 107 represents the combined outputs of detectors in hole 11. The trace 108 represents the combined outputs of detectors in hole 14. The trace 109 is the same as trace 106 and the trace 110 represents the combined outputs of the detectors in hole 12.

Three additional traces are provided on the record 66. The top trace 111 represents a signal from the search control unit to record an indication of the control state of the heads in bank 61. The trace 112 represents the signal from the receiver 78. The trace 113 represents the clock signal and in general will be a series of laterally extending timing bars or markers. Only portions of the markers such as the marker 113a have been shown.

It will be now appreciated that the signals need not be recorded on traces 101–110, but, rather, an observer may merely check the various signal relationships as they appear on the oscilloscope 64 while recording the control state of the first control unit 70. A record such as trace 111 might be the sole record produced in the search operation so that the observer may merely note which of the relative time arrangements as among the heads on bank 61 provide the desired indication of the optimum time shifts for each of the various signal components as among the X, Y and Z axes.

It will now be recognized that the system involving the monitoring drum and the search drum represents an advantageous arrangement inasmuch as the volume of actual records produced will be maintained at a minimum while assuring the capture of all events of interest. It would be possible, of course, by utilizing only the drum 60 in a continuous recording to capture all of the signals and retain them permanently regardless of the amplitude thereof. However, this would require such a bulk of recording material and present such a ponderous task in the analysis thereof, particularly to locate and separate from the recorded data those of coherent nature, that the minimization effected by the system of FIGURE 5 is desirable.

In any event, there is provided for the monitoring of a plurality of signals which are recorded simultaneously in reproducible form. The signals represent seismic energy arriving at each of a plurality of points at selected subsurface depths in a plurality of bore holes. There is a means for simultaneously reproducing the signals with a system such as the network 62 for combining the signals in selected sets wherein each set is limited to signals representing waves arriving at points along a selected axis of reference such as the X, Y, Z axes of FIGURES 2 and 3. Means are provided then for measuring the time differences in the arrival times of coherent energy components of the signals in each of the sets for determination of the direction of arrival of coherent energy components. One means for effecting this measurement is to provide a plurality of records as on the chart 66. Another is to provide instantaneous indications of amplitude combinations as on the oscilloscope 64 while noting, as by the trace 111, the control settings of the search control unit 70.

In one embodiment of the system, the detectors in the bore hole were provided with preamplifiers having a gain of about 250 and were of a nature such that they had a dynamic range of 10,000 or about 80 db. The surface amplifiers in bank 50a were provided with a gain at the upper level A of about 7.5, a gain for the intermediate level B of about 10, and a gain for the lower level C of about 15 in order to provide a relative noise level of signals from each of the selected horizons of equal amplitude. A continuous monitor drum of the type for performing the function of monitor drum 50 was of the type sold by Electrotechnical Laboratories, of Houston, Texas. Such a drum tape recorder was employed in conjunction with a magnetic tape recorder Model BS–7, manufactured and sold by said Electrotechnical Laboratories, which in turn fed the recording system 63 which consisted of amplifiers Model 501 and recorder Model 452, both manufactured and sold by Century Geophysical Corporation, of Tulsa, Oklahoma. Time shifting for the compositing operation as between the drum 60 and the recorder 63 was accomplished by manually shifting the playback heads on the Electrotechnical Laboratories magnetic tape recorder. The time shifting may be carried out either manually or automatically as under the control of a unit such as the search control 70.

The foregoing description has pertained to an analog type unit including the drums 50 and 60 of FIGURE 5 wherein continuous wave forms are recorded, sensed, combined and ultimately recorded on the chart 66. It will be recognized that each operation herein described may be carried out in systems other than of the analog type. More particularly, the more versatile digital computers are admirably suited to operations of this character. That such computers and their operation in general are adaptable to the problem has been widely demonstrated with seismic signals initially being digitized at the output of units in banks 50a and thereafter processed in digital form to ultimate digital recording or to recording in analog form after conversion of digital information to analog signals. That digital treatment of seismic data is well-known is illustrated by the article by Donald R. Oksa, Geophysics, December 1961, page 800 et seq. Digital computers may be programmed to carry out the search as above described, or in other modes as may appear desirable to one skilled in the art, in order to provide an indication of the exact arrival of coherent energy components in the selected planes of reference.

Having described the invention in connection with certain specific embodiments thereof, it is to be understood that further modifications may now suggest themselves to those skilled in the art and it is intended to cover such modifications as fall within the scope of the appended claims.

What is claimed is:

1. In seismic monitoring where a plurality of signals simultaneously recorded in reproducible form have coherent components and noise components representing seismic energy arriving at each of a plurality of points at selected subterranean depths in a plurality of bore holes spaced one from another at a receiving station, the combination which comprises:
    (a) means for simultaneously reproducing said signals,
    (b) means for combining said signals in selected sets,
    (c) means to limit said sets to signals representing waves arriving at points along a selected axis of reference, and
    (d) means for measuring the time of arrival of coherent energy components of signals in each of said sets for determining direction of arrival of said coherent energy components.

2. A system for determining the direction of arrival of coherent energy at a sensing station which comprises:
    (a) a plurality of detectors deployed at each of a plurality of depths in each of a plurality of bore holes located at said station,
    (b) means for recording individually the signals from each of said detectors in reproducible form,
    (c) means for modifying the amplitude character of said signals to a uniform noise level,
    (d) means for combining said signals into separate subgroups, and (e) means to limit said subgroups to three subgroups characterized by detectors located along a given axis of reference passing through said station.

3. The method of determining the direction to an intermittently actuated source of pulsed seismic energy which comprises:
(a) sensing the arrival of seismic energy at each of a plurality of sensing stations spaced one from the other in a solid array at distances of the order of one half wave length at frequencies of the order of from 1 to 10 cycles per second,
(b) modifying the relative amplitudes of the signals detected at each of the sensing stations to a level wherein the incoherent noise energy is of substantially equal amplitude, and
(c) recording individually in predetermined relative time relationship the signals of adjusted amplitude.

4. The method of sensing the direction to an intermittent source of pulsed seismic energy of unknown orientation with respect to the location of a sensing station which comprises:
(a) sensing the arrival of seismic energy at each of a plurality of points spaced one from another in the solid array at said sensing station,
(b) recording the signals detected at each of said points in reproducible form,
(c) reproducing the recorded signals at a rate different than the rate of recording thereof to modify the apparent frequency characteristics thereof,
(d) modifying the reproduced signals for relative amplitudes of incoherent noise portions thereof of equal amplitude,
(e) shifting the relative time relationship of the signals one with respect to the other to bring into phase coincidence coherent components of the signals, and
(f) recording the signals after the time adjustment.

5. In seismic monitoring where a plurality of signals represent seismic energy arriving at a plurality of points at each of a plurality of subterranean depths in a plurality of bore holes spaced one from another at a receiving station, the combination which comprises:
(a) means for combining said signals in selected sets where members of each set are limited to signals representing waves arriving at points along a selected axis of reference, the combining means including at the input thereof a means for individually shifting any one of said signals relative to the other along the time scale, and
(b) means for measuring the time of arrival of coherent energy components of signals in each of said sets for determining the direction of arrival of said coherent energy components.

6. A seismic monitoring system which comprises:
(a) a first set of detectors, one in each of a plurality of bore holes extending to a first subterranean plane to form a first planar array,
(b) a second set of detectors dispersed among said holes but at a second subterranean plane spaced from the first subterranean plane a distance at least as great as the minimum distance between any two of said holes to form a second planar array,
(c) means for selecting from the signal outputs of said detectors those signals which in a given time interval include coherent components,
(d) means for shifting said signals along the time scale each independently of the other to bring said coherent components into time coincidence, and
(e) means for recording at least one selected combination of the signals shifted in time.

7. A seismic monitoring system which comprises:
(a) a solid detector array including five detectors at each of three subterranean horizons penetrated by five bore holes, four of which are oriented in a uniformly spaced array relative to a central hole,
(b) means for combining signals from said detectors to produce a first set of three composite signals representing the sums of the signals from the detectors of each of said three horizons respectively,
(c) means for combining said signals to produce a second set of composite signals representative of sums of signals from detectors in holes lying in a first vertical plane passing through said center hole respectively, and
(d) means for combining said signals to produce a third set of composite signals representative of signals from those of said detectors in a second vertical plane passing through said central hole perpendicular to said first vertical plane.

8. In seismic monitoring where seismic energy has intermittent coherent components and noise components representing seismic energy arriving at a receiving station, the combination which comprises:
(a) means for detecting said seismic energy at each of a plurality of points spaced areally at each of a plurality of points at a plurality of selected subterranean depths in a plurality of boreholes spaced areally one from another at said receiving station,
(b) means for continuously recording in reproducible form signals representing the arrival of the seismic energy detected at each of said points,
(c) means for simultaneously and continuously reproducing the recorded signals,
(d) means responsive to a given character in said recorded signals for selectively combining time segments of said signals into selected sets,
(e) means to limit said sets to signals representing waves arriving at points along a selected axis of reference, and
(f) means for measuring the relative time of arrival of coherent energy components of signals in each of said sets for determining the direction of arrival of said coherent energy components.

References Cited by the Examiner

UNITED STATES PATENTS

| | | | |
|---|---|---|---|
| 2,144,812 | 1/1939 | Rieber | 340—15.5 |
| 2,675,086 | 4/1954 | Clewell | 181—.5 |
| 2,757,750 | 8/1956 | Hawkins et al. | 181—.5 |
| 2,795,287 | 6/1957 | Sharpe | 340—15.5 |
| 2,872,995 | 2/1959 | Wolf | 181—.5 |
| 2,889,000 | 6/1959 | Silverman et al. | 181—.5 |

OTHER REFERENCES

Mark: "The Detection of Nuclear Explosions," Nucleonics, vol. 17, No. 8, August 1959, pages 64–73.

Hearings before Special Subcommittee on Radiation, and the Subcommittee on Research and Development, of the Joint Committee on Atomic Energy; 86th Cong., 2nd sess. April 19–22, 1960, parts 1 and 2.

BENJAMIN A. BORCHELT, *Primary Examiner.*

CHESTER L. JUSTUS, *Examiner.*

R. M. SKOLNIK, *Assistant Examiner.*